Figure 1:
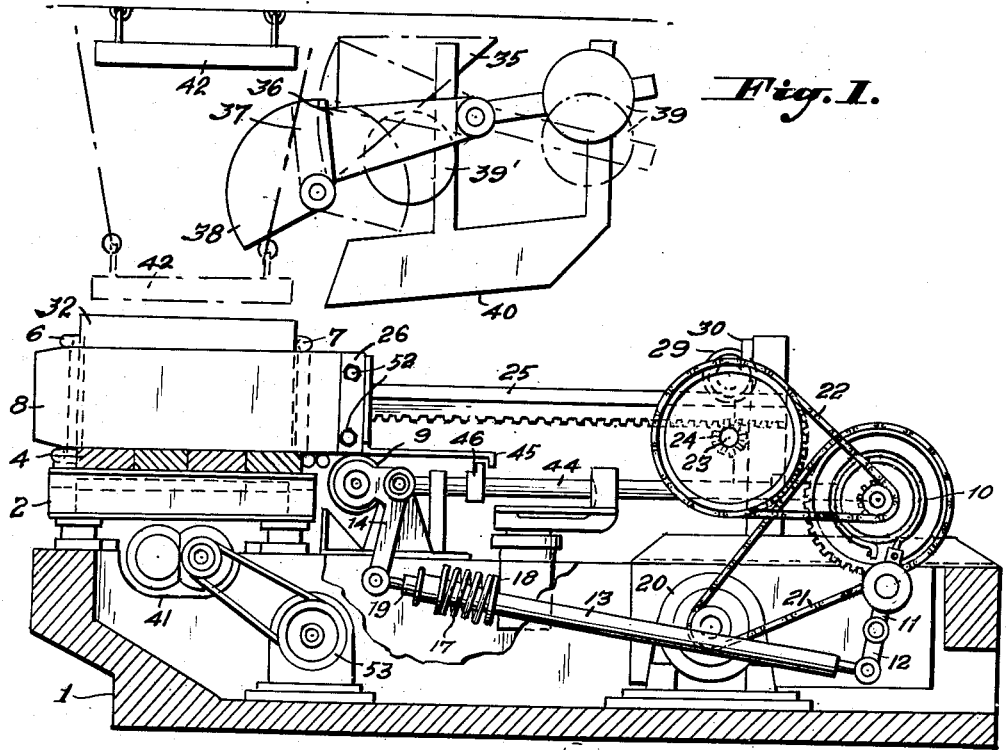

Aug. 10, 1954 K. V. LINDKVIST 2,685,723
DEVICE FOR THE MANUFACTURE OF BUILDING ELEMENTS
Filed March 24, 1950 4 Sheets-Sheet 1

Inventor
Knut Vilhelm Lindkvist
By: Attorneys.

Aug. 10, 1954  K. V. LINDKVIST  2,685,723
DEVICE FOR THE MANUFACTURE OF BUILDING ELEMENTS
Filed March 24, 1950  4 Sheets-Sheet 2
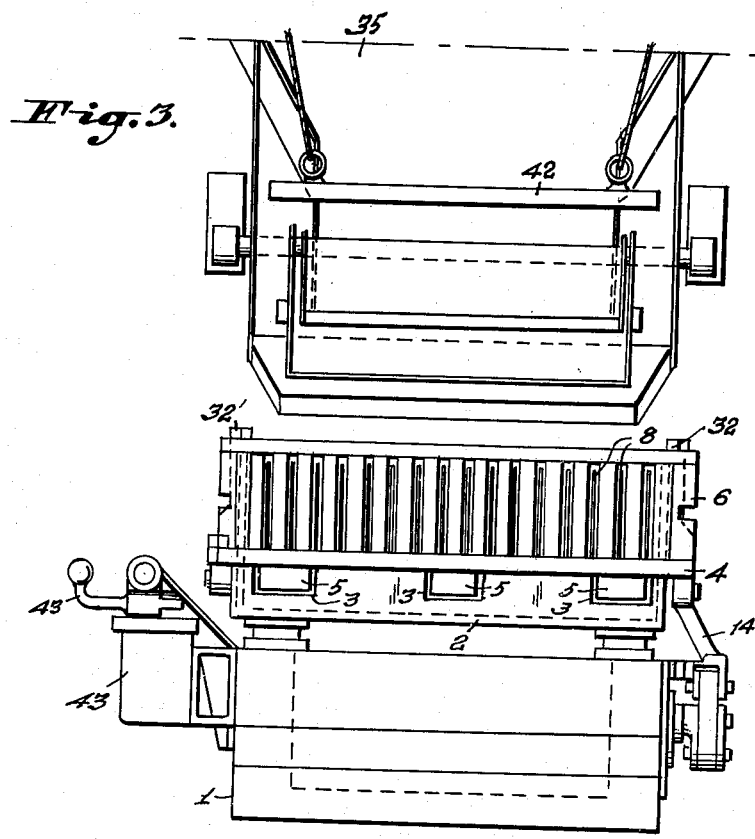
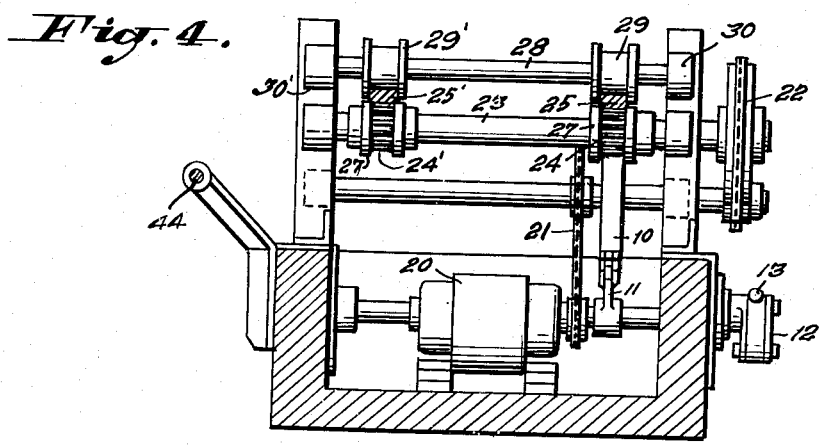
INVENTOR.
Knut Vilhelm Lindkvist
BY
Attorneys.

Aug. 10, 1954 K. V. LINDKVIST 2,685,723
DEVICE FOR THE MANUFACTURE OF BUILDING ELEMENTS
Filed March 24, 1950 4 Sheets-Sheet 4
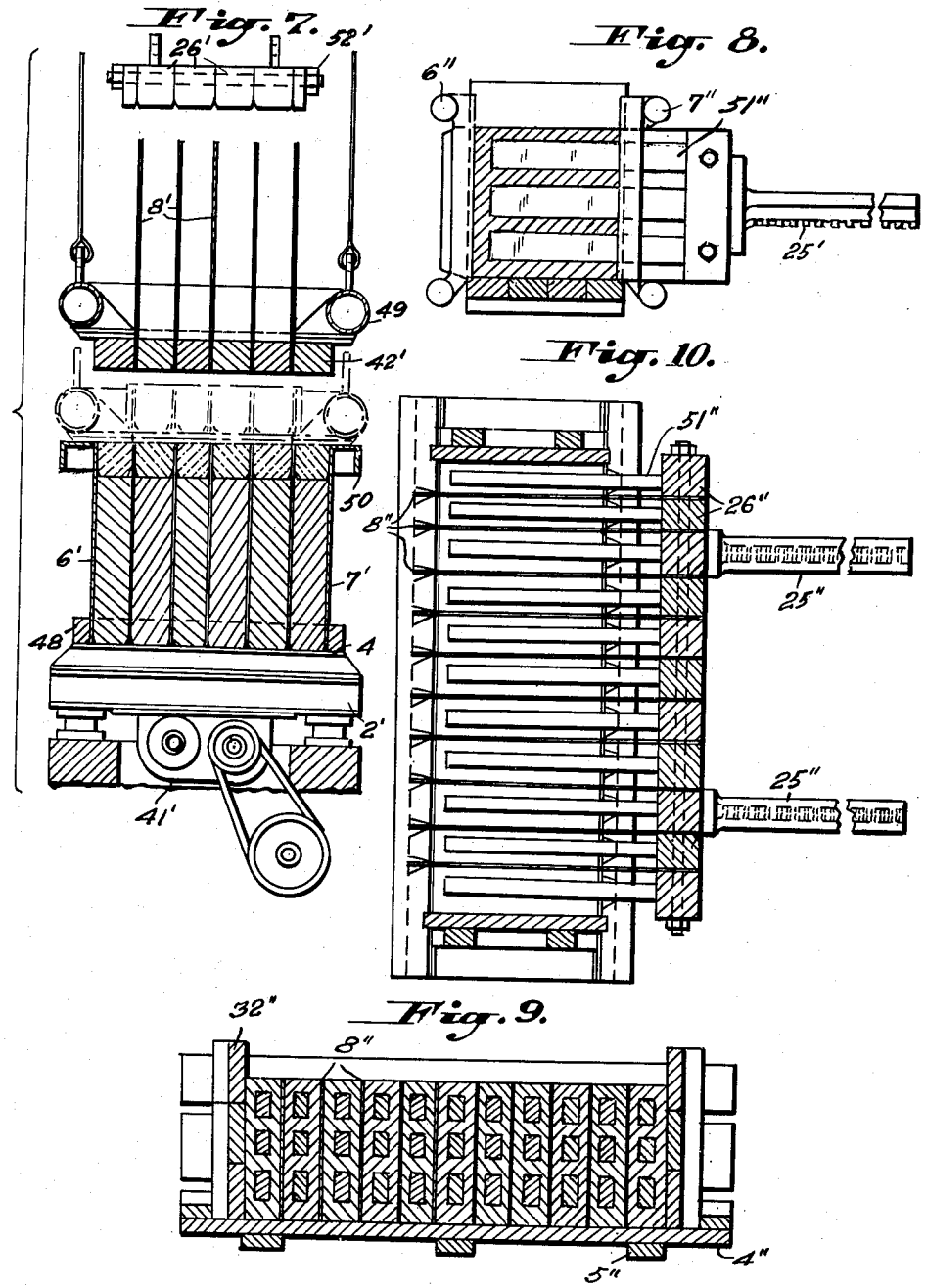
INVENTOR.
Knut Vilhelm Lindkvist
BY
Attorneys.

Patented Aug. 10, 1954

2,685,723

UNITED STATES PATENT OFFICE 2,685,723

DEVICE FOR THE MANUFACTURE OF BUILDING ELEMENTS

Knut Vilhelm Lindkvist, Stockholm, Sweden

Application March 24, 1950, Serial No. 151,564

2 Claims. (Cl. 25—41)

The present invention relates to a device for manufacturing a plurality of building elements, for instance plates, blocks and beams, in which the material for the building elements is cast in a detachable moulding case with partitions and compressed to a certain volume by means of a platen or plate for appropriate weight placed on the cast material and also by subjecting the moulding case or mould box with its content of cast material to vibration or shaking, and is mainly characterized in that the partitions are inserted horizontally or vertically through slots in two opposite walls of the moulding case, whereupon the casting and vibration takes place, and in that on completion of the moulding, the partitions are pulled out in the direction which is most suitable for the procedure. According to the invention, the partitions are moved somewhat above the bottom of the moulding case, when being pushed into the case and are then lowered down thereupon, all in order to reduce the frictional resistance and spare the bottom of said case or box.

Slightly conical cores may be pushed into the moulding case between and simultaneously with the insertion of the partitions through holes provided in the walls of the moulding case, which cores are removed again upon completion of the moulding. According to the invention, and after the casting and removal of the partitions, possibly also the cores, is effected, the moulding case with the building elements may be transported to a hardening plate, where at least two opposite walls of the moulding case, usually the walls provided with the slots and holes, may be removed immediately and brought back to the area where further moulding or casting is to be performed.

The invention also relates to a device, substantially characterized by a moulding case or mould box comprising detachable sides, of which two oppositely disposed sides are provided with several slots extending transversely thereof, and a movable block or cross frames in which parallel partitions are secured in such a manner that they may be inserted through the said slots into the moulding case, said device furthermore being characterized by the provision of means for compressing and vibrating casting material contained in the moulding case. Slightly conical cores may be mounted between the partitions and extending parallel therewith, and holes may be provided in the slotted side walls, so that the cores may be inserted into the moulding case together with the partitions.

Figure 2:
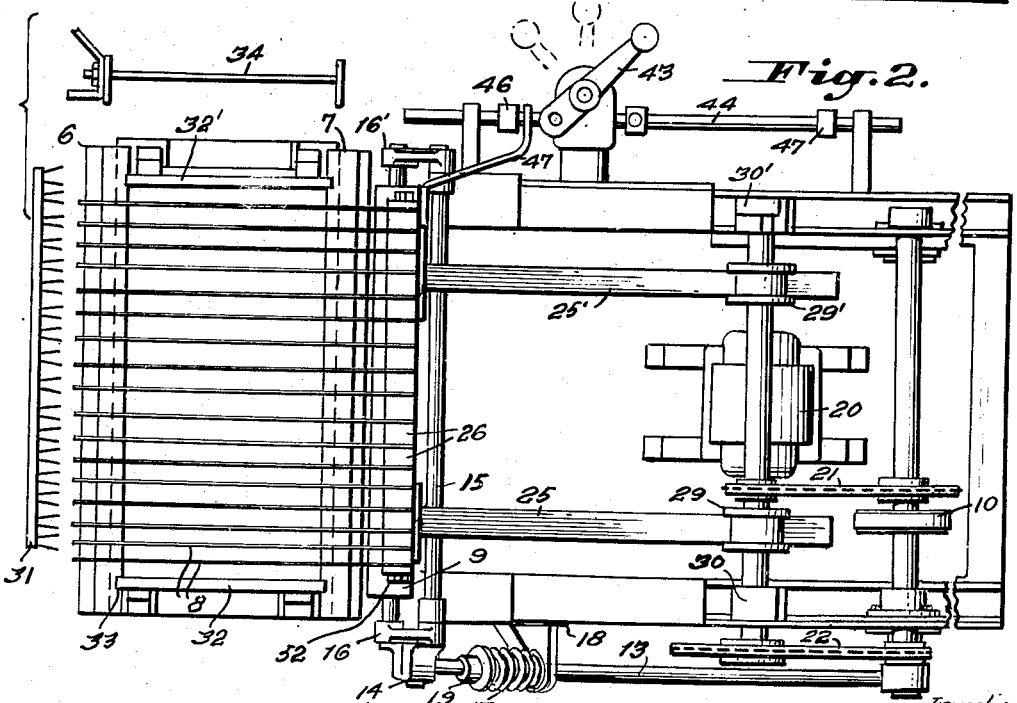
Figure 5:
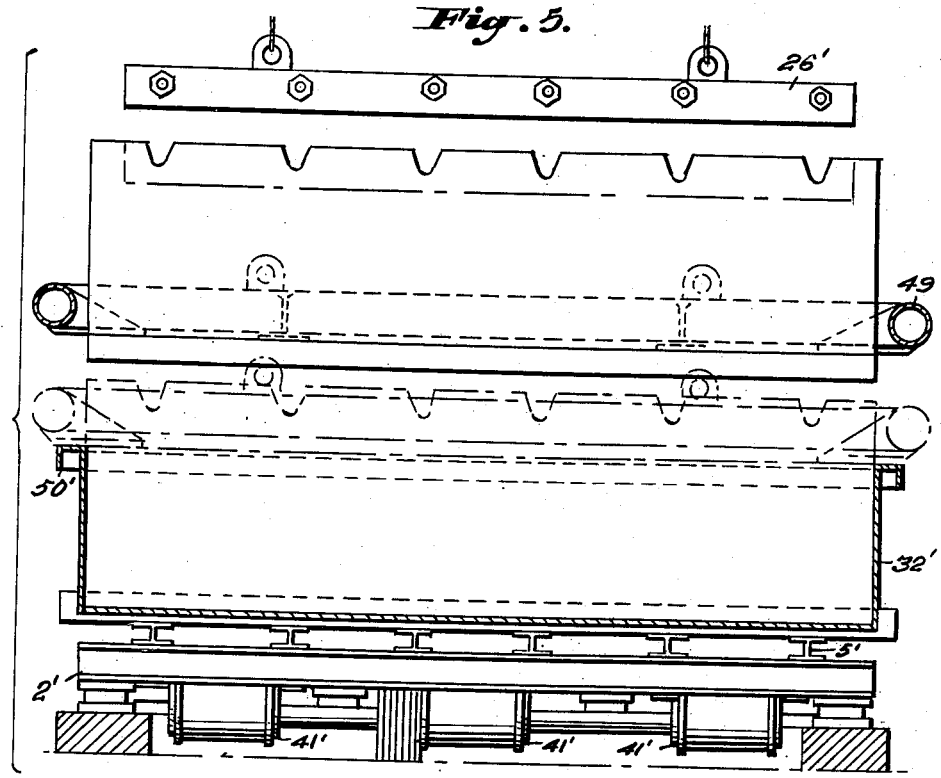

The principle of the invention is illustrated in the accompanying drawings, in which Fig. 1 is a vertical section, Fig. 2 a horizontal planed view of the arrangement of Figure 1 with the feed means removed, Fig. 3 an end view and Fig. 4 a cross-section of the essential means necessary for carrying out the method for manufacture of plates of ordinary type. Fig. 5 is a vertical section, Fig. 6 a horizontal projection and Fig. 7 a cross-section of a modified method according to the invention for the manufacture of long plates, beams or disks. Figs. 8, 9 and 10 show a cross-section, a longitudinal section and a horizontal section respectively of another modified method and apparatus according to the invention for manufacturing building elements (in this case relatively thick plates) provided with channels to a desired depth.

On a strong foundation 1 there rests a resiliently supported vibrating table 2, connected with a vibrator 41 which by means of a belt drive is driven by an electric motor 53, said vibrator imparting a substantially vertically oscillating motion to the vibrating table. The latter is provided with transverse grooves 3, in which the rails 5 of the moulding case bottom 4 are guided laterally. The grooves terminate in an abutment surface, so that the moulding case bottom is fixed in its position. The right ends of the insertable partitions 8 are mutually interconnected by two long bolts 52 carrying spacers 26 which separate the partitions from each other. The spacers and the partitions are horizontally displaceable perpendicularly to the longitudinal side 7 by means of a mechanical hydraulic, pneumatic or otherwise suitably functioning means, of which a mechanical embodiment is described in the following text.

Upon erection of the longitudinal side 7, which is provided with vertical slots, on the moulding case bottom 4, all the partitions 8 are pushed in simultaneously through the slots in a position somewhat elevated from the moulding case bottom, and the said position is effected by means of an elongated carrying roller 9, extending parallel with the side 7, and through the levers 16, 16' is mounted eccentrically of the shaft 15 and may be raised and lowered by movement of the lever 14, the bar 13 and the levers 11, 12. The power used to raise the carrying roller and its load is taken from a friction belt 10, which is pressed against a rotating wheel. In order to facilitate the raising of the carrying roller, a compression spring 17, pre-loaded by the weight of the carrying roller, is placed around the bar 13 inside a carrier 18, which is fixed to the foundation 1. The compression spring 17 actuates an adjustable abutment 19 on the bar 13. The partitions are pushed into the moulding case in elevated position in order to prevent damaging of the moulding case bottom 4.

The power moving the partitions forwards and backwards is supplied by an electric motor 20, which via the roller-chain-transmissions 21, 22 rotates a combined drive and support shaft 23 provided with two spur gears 24, 24' in turn meshing with racks 25, 25', the left ends of which are fixed to the spacers 26. Guidance of the racks 25, 25' is effected by the flanged wheels 27, 27' mounted on the shaft 23 and the flanged wheels 29 mounted on a cross shaft 28 journalled in the bearings 30, 30' and mounted above and parallel to shaft 23.

When the partitions have been pushed into the future moulding case, a tool 31 is placed upon the partitions, whereby their free ends are uniformly spaced from each other, whereupon the longitudinal side 6, which is shaped in the same manner as the longitudinal side 7 and thus provided with vertical slots, may be pushed on and mounted in its place. The moulding case is completed by pushing the end walls 32, 32' into the grooves 33 provided in the longitudinal sides 6 and 7 and barring them or clamping the four sides together by means of a pair of stretchers 34 which are inserted into the respective grooves 33 in both ends of the longitudinal sides.

The moulding case is now ready to receive the material to be moulded. This consists of filling material and binding agent, which after apportionment and mixing is charged into a silo 35, the lower part 36 of which is provided with a discharge valve 37. When the latter is opened, the material flows down a tilting chute 38 to different parts of the moulding case. Upon delivery of a suitable quantity, the valve is closed, whereafter the chute is swung up to the chain-dotted position in Fig. 1. In order to facilitate the movements of the valve and the chute, they are preferably counter-balanced by damper weights 39, 39' or by springs serving the same purpose, and engine-operated when of large dimensions.

For practical reasons the longitudinal sides of the moulding case are made so high that, when material has been filled into the case, the surface may be planed or with a planing tool along the longitudinal sides. The surplus material is transmitted to the table 40.

The vibrator 41 is started and run for some seconds, whereupon any irregularities in the surface are filled out by means of a rake. Following this a heavy platen or plate 42 suspended above the moulding case is lowered down upon the material surface and the vibrator is started again and run for a suitable time, at all events until the platen or plate 42 has reached the upper edges of the partitions or specially provided stop members at the same level.

Then all the partitions are drawn out immediately by moving the handle of the starting rheostat 43 of the electrical motor in the same direction as the desired direction of motion of the partitions. A special interconnection of this handle of the starting rheostat and the disconnecting means 44, which is actuated by an arm 45 in the two adjustable end positions 46, 47, serves to stop the motor 29 automatically if the starting rheostat 43 is incorrectly operated and also when the rack has reached its respective end positions.

When the planing plate 42 is returned to its upper limit, the moulding case is lifted by means of a push-button-controlled telpher running on a turntable cantilever truss and moved to a suitable place on the adjacent floor, where the moulding cases are piled up successively upon each other. As soon as a pile of moulding cases has reached a suitable height, it is lifted by means of a special truck, telpher, bay, pallet or other effective transport means, moved to a suitable hardening place and lowered to the floor, and then the longitudinal sides of the moulding cases are removed and returned for the production of new moulding cases, possibly after cleaning. During the time needed for transporting a moulding case to the nearest pile by means of the telpher, a new moulding case bottom is placed on the vibrating table, whereupon the whole procedure described above is repeated.

It is clear therefore, that the present invention provides apparatus for simultaneously moulding a plurality of building elements such as plates, blocks, bricks, beams and the like. The apparatus includes a mould box that comprises a bottom and detachable sidewalls. At least one pair of oppositely facing sidewalls have transversely extending slots therein. A frame is mounted for movement toward and away from the sidewalls and on the frame there is mounted a plurality of spaced parallel partition elements in such relationship as to be in alignment with the slots and sidewalls. Means are provided for moving the frame toward the walls to insert the partitions within the mould box. These means include a pinion, a rack that is connected to the frame and meshes with the pinion, a pivotally mounted roller supporting and contacting the frame and at least one of the partitions. There are drive means for moving the roller through a vertical arc a distance such that the surface of the roller that contacts the frame is movable from the position above the bottom of the mould box to a position at least parallel with the bottom and in substantially the same plane. There are drive means for driving the pinion in opposite directions so as to correspondingly move the rack to insert and withdraw the partitions. The means that pivot the roller are operable during the insertion of the partitions to guide the same and the frame in a path above the mould between so that the partitions are passed through the slots in spaced relation to the bottom and then lowered thereupon to eliminate friction during insertion. The apparatus further includes means for introducing a mouldable material into the mould box and means for compressing and vibrating the material in the box so as to produce the elements.

Figure 6:
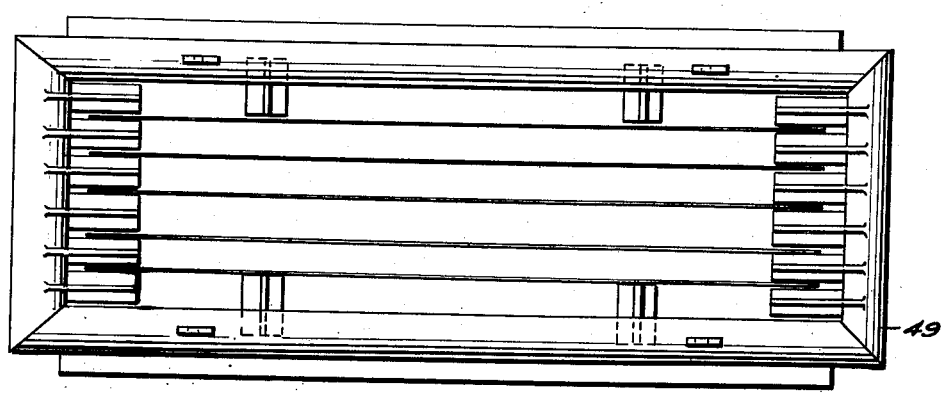

If long building elements are to be produced by means of the method according to the invention, such as for instance large wall elements or beams, it is preferred to use the means shown in Figs. 5–7. Fig. 5 shows a longitudinal section through the vibrating table and the moulding case. The elements 41 giving vibration impulses are spaced along the lower side of the vibrating table 2', so that the latter receives the same amplitude everywhere at the vertical oscillation. Upon the vibrating table the moulding case bottom 4' is resting, which is provided with cross bars 5', some of them placed between guide blocks for fixing the moulding case bottom at the foundation, and furthermore with longitudinally extending grooves serving as bottom guides for the vertical partitions 6'. At the lower ends, all the side walls are prevented from bulging outwards by ledges 48 on the moulding case bottom, and at the top they are reinforced by a reinforcing frame 50. In this case the heavy planing plate is divided up into a number of elongated elements 42' fixed between corresponding reinforced flat bars in the end sides of a strong frame 49 of tubing or the like. Slots for the partitions 6' are provided between the elements 42'. The transverse sides of the moulding case are preferably provided with vertical grooves, which serve as guides for the vertical side edges of the partitions.

After the moulding case has been mounted with side walls and reinforcing frame and barred, the partitions, which are secured to the block 26′, are lowered down in the respective guides in the moulding case, whereupon the partitions are released from the block 26′ by slacking off bolts 52′, the material is filled into and planed or smoothed off in the moulding case, the planing plate is lowered down upon the moulding case so that the upper edges of the partitions pass through the slots between the elements 42′, and the vibration of the moulding case is carried out as described above. When the frame 49 has been coupled together with the reinforcing frame 50 of the moulding case, the block 26′ is lowered again and coupled to the upper edges of the partitions, which are extending above the planing plate, whereupon the block is lifted up and pulls the partitions up of the moulding case, the frame 49 is loosened and the moulding case is moved to a suitable hardening place etc. in principle in the same manner as previously described.

For the manufacture of blocks or thick plates of low weight per unit of volume, it is at times desirable to use the modification of the invention shown in Figs. 8 to 10, in which the moulding case with bottom 4″, longitudinal sides 6″, 7″ and end walls 32″ differs from the moulding case according to Figs. 1–3 only therein that the longitudinal side 7″ in addition to the vertical slots for the partition 8″ is also provided with holes for slightly conical cores 51″, which are secured in desired number to the spacers 26″ between and spaced from the partitions 8″. The cores are inserted into, and pulled out of respectively, the moulding case simultaneously with the partitions. In this manner building elements having cavities to a desired depth may be produced, in doing which only a relatively small number of partitions and cores are needed.

The slightly conical cores 51″ may be secured in desired number and suitable form to the spacers 26′ of the block, between and outside the partitions 8″, inserted into the moulding case, and pulled out of it respectively, simultaneously with the partitions through special apertures in the moulding case bottom 4″, the sides 6″, 7″, 32″ or the plaining plate.

When the building elements (Figs. 5, 6, 7) shall consist of for instance long wall elements or beams and the partitions 8′ are preferably parallel with the longitudinal sides 6′, 7′ of the moulding case, horizontal traversing slots for the partitions are provided in the moulding case bottom 4′ and in the planing plate 42′ and vertical grooves in the end sides 32′ of the moulding case, and the upper edges of the moulding case is provided with a reinforcing frame 50 and the element 42′ of the planing plate is connected to a frame 49, for the purpose that it shall be possible to lower the partitions down into the moulding case by means of the block 26, 26′, to which they are secured when necessary, and to lift them up again from the moulding case after the casting has been performed and the frame 50 has been coupled together with the reinforcing frame 49.

Upon completion of the casting in the moulding case and removal of the partitions, the said case is lifted and transported by a telpher, running on a horizontal, turnable cantilever truss, to a place on the floor in the vicinity of the working machine, where the moulding cases are successively piled upon each other to a suitable height, and then the pile is transported by truck, telpher, bay or some other effective transport means to the hardening place of the building elements, where the longitudinal sides 6′, 7′ are immediately removed and brought back to be used for new moulding cases after cleaning.

The mechanical means moving the block 26, 26′ with the partitions 8 and possible cores 51″ are placed on the same fundament 1 as the vibrator table 2.

The invention is not confined to the details described above. The said details may be varied in many ways without abandoning the inventional idea.

Although it has not been shown in any of the figures, the partitions 8 and the corresponding slots of course may have a curved or broken shape if necessary, provided that the partitions are mutually parallel in their direction of motion.

Having now described my invention, what I claim as new and desire to secure by Letters Patent is:

1. Apparatus for simultaneously moulding a plurality of building elements such as plates, blocks, bricks, beams and the like including a mould box comprising a bottom and detachable side walls, at least one pair of oppositely facing side walls having transversely extending slots therein, a frame movable toward and away from said slotted side walls, a plurality of spaced parallel partition elements mounted on the frame in alignment with the slots in the walls, means for moving the frame toward the walls to insert the partitions within the mould box comprising at least one pinion, a rack meshing therewith and connected to said frame, a pivotally mounted roller supporting and contacting said frame and at least one partition, means for moving said roller through a vertical arc a distance such that the surface of the roller contacting the frame and at least one partition is movable from a position above the bottom of the mould box to a position at least parallel with the bottom and means for driving said pinion in opposite directions to insert and withdraw said partitions and the means for pivoting said roller being operable during insertion of the partitions to guide said partitions and frame in a path above the mould bottom so that the partitions are passed through the slots in spaced relation to the mould bottom and then lowered upon the bottom to eliminate friction during insertion, means for introducing mouldable material into the mould box and means for compressing and vibrating the material in the box to produce the elements.

2. Apparatus as defined in and by claim 1 in which the slotted walls are provided with apertures between the slots and conical cores are connected to the frame between the partitions and extending parallel thereto and are insertable within the mould box together with the partitions upon movement of the frame.

References Cited in the file of this patent

UNITED STATES PATENTS

| Number | Name | Date |
|---|---|---|
| 679,232 | Kimble | July 23, 1901 |
| 780,167 | Gaspary | Jan. 17, 1905 |
| 817,189 | Reed | Apr. 10, 1906 |
| 940,741 | Scott et al. | Nov. 23, 1909 |
| 1,226,765 | Folden | May 22, 1917 |
| 1,846,290 | Walter | Feb. 23, 1932 |
| 1,987,721 | Straub | Jan. 15, 1935 |
| 2,308,132 | Wellnitz | Jan. 12, 1943 |
| 2,514,971 | Reed | July 11, 1950 |
| 2,560,781 | Schaaf | July 17, 1951 |